Patented Dec. 31, 1935

2,026,195

UNITED STATES PATENT OFFICE 2,026,195

PROCESS FOR BREAKING PETROLEUM EMULSIONS

Charles N. Stehr, Alhambra, Calif., assignor to Tretolite Company, Webster Groves, Mo., a corporation of Missouri No Drawing. Application November 12, 1934, Serial No. 752,713

4 Claims. (Cl. 196—4)

This invention relates to the treatment of emulsions of mineral oil and water, such as petroleum emulsions, for the purpose of separating the oil from the water.

Petroleum emulsions are of the water-in-oil type, and comprise fine droplets of naturally-occurring waters or brines, dispersed in a more or less permanent state throughout the oil which constitutes the continuous phase of the emulsion. They are obtained from producing wells and from the bottoms of oil storage tanks, and are commonly referred to as "cut oil", "roily oil", "emulsified oil" and "bottom settlings".

The object of my invention is to provide a novel, inexpensive and efficient process for separating emulsions of the kind referred to into their component parts of oil and water or brine.

Briefly described, my process consists in subjecting a petroleum emulsion of the water-in-oil type, to the action of a treating agent or demulsifying agent of a particular composition hereinafter described, thereby causing the emulsion to break down and separate into its component parts of oil and water or brine, when the emulsion is permitted to remain in a quiescent state after such treatment, or is subjected to an equivalent separatory procedure.

Various classes of materials have heretofore been used or suggested as demulsifying agents in the resolution of petroleum emulsions, such as water softeners, modified fatty acids, hydroxy aromatics, various non-fatty sulfonic acids, etc. Mixtures of materials of the kind above mentioned have also been used or suggested, sometimes with improved results. Generally, when various classes of materials are efficient demulsifiers, mixtures of such materials are also efficient demulsifiers, provided that the materials constituting a mixture are not incompatible, but the value or effectiveness of a mixture produced by combining a known demulsifier selected from one class, with another known demulsifier selected from a different class, can easily be determined by simple routine chemical experimentation. There are instances where particular petroleum emulsions or particular types of emulsion will not respond to treatment with the individual members of a class or classes of demulsifiers, or with mixtures produced from selected members of two different classes of known demulsifiers, and when such emulsions are encountered, inventive ability is often required to produce a demulsifying agent that will successfully "break" or treat the emulsion under consideration. An example of a demulsifying agent of the kind last referred to is the one described in U. S. Patent No. 1,659,998, to Keiser, dated February 21, 1928, which demulsifying agent consists of a mixture of previously known demulsifiers, combined in certain specific proportions.

The treating agent contemplated by my process is a mixture containing blown oils and certain other materials. The mixture is oil-soluble at least in higher concentrations, and contains, in addition to blown oils, sulfo-fatty acids in the form of an acid salt, non-sulfo-fatty materials and aliphatic monohydric alcohols. Still another distinguishing characteristic of said mixture is that it is characterized by the substantial absence of water, which is present only to the extent of an extraneous impurity, being generally less than 5%, and in many cases, containing less than 1%. In view of the fact that it is substantially anhydrous, I prefer to refer to it as an "anhydrous" mixture, but I wish it to be understood that the term "anhydrous" is intended to include such small amounts of extraneous water which may be present as a result of the manufacturing processes, in spite of the effort to eliminate water from the mixture. A small amount of water may be incorporated as impurities in the alcohols hereinafter referred to, that form a constituent of the mixture. As a rule, if the total amount of water present is in excess of 1½%, then, there must be present in the mixture alcohols having at least three carbon atoms, such as propyl alcohol, butyl alcohol, etc. It is immaterial whether or not the said mixture is water-soluble.

Blown oils are oils derived by artificial oxidation of reactive fatty oils or reactive fatty acids. Certain examples of blown oils are described in U. S. Patent No. 1,929,399, to Fuchs, dated October 3, 1933. Drastically oxidized castor oil, which may be used as an example of the blown oil constituting part of the mixture employed as the demulsifying agent of my process, is described in the co-pending application for patent of De Groote and Keiser, Serial No. 715,773, filed March 15, 1934. The expression "blown oils" is herein used to include blown fatty acids, as well as blown glycerides of fatty acids or blown mixtures of acids and glycerides. Any blown oils of any of the various types proposed for breaking petroleum emulsions of the water-in-oil type, may be used as one member, ingredient or constituent of the mixture contemplated by my process.

Sulfo-fatty acids are derived by the sulfation or sulfonation of fatty materials alone, or fatty materials in the presence of reactive aromatics, as in the production of sulfo-aromatic fatty acids.

Sulfo-fatty acids comprise true sulfonic acids, fatty acid sulfates and sulfo-aromatic fatty acids. The expression "sulfo-fatty acids" is herein employed to refer to the class composed of the three members just mentioned. It is to be noted that these sulfo-fatty acids are dibasic acids, having a strong acid hydrogen in an acid sulfate group, or in a sulfonic group, as well as a weak acid hydrogen in the carboxyl group. When these dibasic acids are neutralized with any suitable base, such as caustic soda, potassium hydroxide, strong ammonia, triethanolamine, and the like, so as to be neutral to methyl orange indicator, only the strong sulfo-hydrogen is neutralized. Further addition of an alkali results in neutralization of the carboxylic hydrogen, so that the compound becomes alkaline to phenolphthalein indicator. The salts of sulfo-fatty acids which are neutralized only to methyl orange indicator, are referred to as acid salts. My process contemplates the use of a mixture in which the sulfo-fatty acids are present solely as acid salts, and not as neutral salts, except to the extent that there might be a relatively slight over neutralization. Sometimes the acid salts of sulfo-fatty acids decompose, especially when neutralized with ammonia, so that they may even exhibit acidity to methyl orange indicator. This is not objectionable from the standpoint of the value of the mixture used as the demulsifying agent of my process, beyond the fact that such a mixture may become corrosive in regard to metal surfaces. The manufacture of suitable acid salts is described in U. S. Patent No. 1,894,759 to De Groote and Wirtel, dated January 17, 1933.

The non-sulfo-fatty material employed as one constituent of the mixture contemplated by my process may be of the kind commonly used for breaking oil field emulsions. This component may be derived by the sulfation or sulfonation of any reactive fatty materials, such as oleic acid, castor oil, and the like. Such sulfated or sulfonated fatty material may be hydrolyzed, so as to be substantially free from all organically combined sulfur. Suitable non-sulfo unsaponified fatty bodies are described in U. S. Patent No. 1,940,397, to De Groote and Wirtel, dated December 19, 1933.

The word "saponification" is used in the chemistry of fats to indicate the production of soaps or fatty acids from glycerides, etc. A fatty acid is sometimes referred to as being saponified when it is converted into a salt, such as sodium oleate. The non-sulfo fatty acids in the mixture contemplated by my process, are herein referred to as unsaponified in the sense that they are free from a metal atom or metallic radical, such as ammonium radical, in the carboxylic hydrogen position. In other words, the fatty acids may be used as such, or they may be used as esters, or in some other suitable form such as anhydrides, ester acids, or the like, but they are not intended to be used in the form of salts, except to the extent that a very small amount of salts may be present as impurities. Accordingly, the expression "unsaponified fatty acids", as herein employed, is intended to include the esters and other abovementioned derivatives, as well as fatty acids, and the use of the expression is not intended to be limited to the fatty acids alone. Such forms are characterized by water-insolubility.

The alcohols comprising one member or ingredient of the mixture employed as the treating agent or demulsifying agent of my process, are selected from the class of aliphatic alcohols, and preferably those having at least three carbon atoms, such as propyl alcohol, isopropyl alcohol, butyl alcohol, isobutyl alcohol, secondary butyl alcohol, amyl alcohol, etc. Various isomers may be used instead of the normal alcohol. Mixtures of two or more suitable alcohols may be used. The class of suitable alcohols is furthermore restricted to the aliphatic monohydric alcohols. Ethyl alcohol, methyl alcohol, and denatured alcohol, mixtures of the same, or mixtures with butyl alcohol, propyl alcohol, etc. may be used. It should be noted that if ethyl alcohol, methyl alcohol, or denatured alcohol are to be used solely to supply the monohydric alcohol ingredient of the mixture comprising the demulsifying agent, then the water content must approximate the lower limits, previously referred to, or about 1½%. For convenience in manufacture, it appears more desirable to use monohydric alcohols having at least three carbon atoms, and thereby no difficulty is encountered, even if the water content is double or triple the 1½% limit previously referred to.

Mixtures from the four classes above named are made so that the proportions of the final mixture are substantially as follows:

|  | Per cent |
|---|---|
| Blown oil derived from a reactive fatty body | 15–50 |
| Acid salt or salts of a sulfo fatty acid or acids | 2–15 |
| Unsaponified non-sulfo fatty acids | 20–60 |
| Monohydric aliphatic alcohols, preferably having at least 3 carbon atoms | 5–25 |
| Selected to total | 100 |

The mixture previously described may be prepared in any suitable manner. For instance, one may prepare a fatty sulfonation mass so that the resultant product supplies both the sulfo-fatty acid salt and also the non-sulfo, unsaponified, fatty material. Such sulfonated mass is washed in the conventional manner, permitted to separate, and then neutralized to methyl orange indicator. The blown oil may be diluted with a suitable amount of the selected alcohol, such as isopropyl alcohol, and then this mixture may be added to the mixture of the sulfo-fatty material and the non-sulfo fatty material. The individual reagents employed to compose the mixture are readily available on the open market, or the said reagents can be easily produced by well known procedure. While I have described one way of preparing the mixture which is employed as the demulsifying agent of my process, I wish it to be understood that it is immaterial how said mixture is prepared or produced, so long as the mixture comes within the particular limits herein specified.

It is to be noted that substantially the only hydrophile (water-soluble) fatty component of the mixture is the acid salt of the sulfo-fatty acid. The amount of this acid salt of a sulfo-fatty acid may be so low that the mixture has relatively little miscibility with water, but it is always miscible with oil, at least in higher concentrations of 25 to 50% by volume. However, in those instances where the amount of the acid salt of the sulfo-fatty acid is relatively high, the mixture may give a perfectly stable solution or suspension when mixed with water, and if one desires, such an aqueous solution or suspension may be employed. In practising my process I prefer to employ the above described mixture in a substantially water-insoluble form, and preferably without aqueous dilution. I have found that the best results are obtained by the use of the reagent, whether it be water-soluble or not, either directly without any dilution, or after mixture with crude oil or the like, rather than any mixture or solution with water. In the claims I have used the expression "without aqueous dilution" to mean that the mixture is used as such, or after dilution with crude oil.

My preferred demulsifying agent is manufactured in the following manner:

600 lbs. of castor oil are subjected to sulfation by reaction with 300 lbs. of 66° Baumé sulfuric acid at a temperature of approximately 40° to 55° C. The acid is added in approximately 4½ to 7 hours, depending upon atmospheric temperature. After all the acid is in, the acid mass is permitted to stand about 15 to 25 hours longer, depending on atmospheric temperature. The acid mass is then washed with 50% of its volume with 10% sodium sulfate solution, and allowed to separate, and the wash water is discarded. This washing process is repeated a second time, after which a 20% solution of caustic soda is added until the mass is just neutral to methyl orange indicator. If properly conducted, the amount of acid sodium salt of sulfo-fatty acid is approximately 10% of the anhydrous fatty material. After allowing this neutralized mass to stand 72 hours, and withdrawing any additional water which may have been separated, there is then added 600 lbs. of drastically blown castor oil, of the kind described in co-pending application for patent of De Groote and Keiser, Serial No. 715,773, filed March 15, 1934. There is also added 300 lbs. of isopropyl alcohol, and the mixture is agitated well. The resulting product should be a homogeneous mass, which does not show any separation. In the event that any separation does occur, small additional amounts of isopropyl alcohol, for instance, 25-lb. amounts, must be added until the mixture stays homogeneous, and does not separate, even when allowed to stand 30 days or longer. This homogeneous material is then in suitable condition for use as a demulsifying agent for petroleum emulsions.

From the foregoing I believe it will be apparent that my invention is not concerned with all mixtures of the four classes of materials previously used for demulsification, but, on the contrary, is concerned only with a very limited class or type of mixtures, which must have a certain characteristic composition of a kind not heretofore employed in the resolution of oil field emulsions. The superiority of the reagent or demulsifying agent contemplated by my process is based upon its ability to treat certain emulsions more advantageously and at a somewhat lower cost than is possible with other known demulsifiers, or conventional mixtures thereof. It is believed that the particular demulsifying agent or treating agent herein described will find comparatively limited application, so far as the majority of oil field emulsions are concerned, but I have found that such a demulsifying agent has commercial value, as it will economically break or resolve oil field emulsions in some cases which cannot be treated as easily and at so low a cost with the demulsifying agents heretofore available.

In practicing my process, a treating agent or demulsifying agent of the kind described above may be brought in contact with the emulsion to be treated in any of the numerous ways now employed in the treatment of petroleum emulsions of the water-in-oil type with chemical demulsifying agents, such, for example, as by introducing the treating agent into the well in which the emulsion is produced; introducing the treating agent into a conduit through which the emulsion is flowing; introducing the treating agent into a tank in which the emulsion is stored; or introducing the treating agent into a container that holds a sludge obtained from the bottom of an oil storage tank. In some instances, it may be advisable to introduce the treating agent into a producing well in such a way that it will become mixed with water and oil that are emerging from the surrounding strata, before said water and oil enter the barrel of the well pump or the tubing up through which said water and oil flow to the surface of the ground. After treatment, the emulsion is allowed to stand in a quiescent state, usually in a settling tank, and usually at a temperature varying from atmospheric temperature to about 200° F., so as to permit the water or brine to separate from the oil, it being preferable to keep the temperature low enough to prevent the volatilization of valuable constituents of the oil. If desired, the treated emulsion may be acted upon by one or more of the various kinds of apparatus now used in the operation of breaking petroleum emulsions, such as homogenizers, hay tanks, gun barrels, filters, centrifuges, or electrical dehydrators.

The amount of treating agent that may be required to break the emulsion may vary from approximately 1 part of treating agent to 500 parts of emulsion, up to 1 part of treating agent to 20,000 or even 30,000 parts of emulsion. The proportion depends on the type of emulsion being treated, and also upon the equipment being used, and the temperature employed. In treating exceptionally refractory emulsions of the kinds known as "tank bottoms" and "residual pit oils" the ratio of 1:500, above referred to, may be required. In treating fresh emulsion, i. e., emulsions that will yield readily to the action of chemical demulsifying agents, the ratio of 1:30,000, above referred to, may be sufficient to produce highly satisfactory results. In general, I have found that for an average petroleum emulsion a ratio of 1 part of treating agent to 5,000 parts of emulsion will usually be found to produce commercially satisfactory results.

Having thus described my invention, what I claim as new and desire to secure by Letters Patent is:

1. A process for breaking petroleum emulsions of the water-in-oil type, characterized by subjecting the emulsion to the action of a demulsifying agent consisting of a substantially anhydrous mixture while oil-soluble at least in higher concentrations and comprising the following components: (a) 15 to 50% of blown oil bodies; (b) 2 to 15% of an acid salt or salts of a sulfo fatty acid; (c) 20 to 60% of an unsaponified sulfur-free fatty acid derived by a sulfation process and followed by a hydrolytic decomposition accompanied by the splitting of sulfuric acid; (d) 5 to 25% of an aliphatic monohydric alcohol or alcohols, the said proportions being said to total 100 parts.

2. A process for breaking petroleum emulsions of the water-in-oil type, characterized by subjecting the emulsion to the action of a demulsifying agent consisting of a substantially anhydrous mixture, oil-soluble at least in high concentrations and comprising the following components: (a) 15 to 50% of blown fatty bodies; (b) 2 to 15% of an acid salt or salts of a sulfo fatty acid; (c) 20 to 60% of an unsaponified sulfur-free fatty acid derived by a sulfation process and followed by a hydrolytic decomposition accompanied by the splitting of sulfuric acid; (d) 5 to 25% of an aliphatic monohydric alcohol or alcohols having at least 3 carbon atoms, the said proportions being selected to total 100 parts.

3. A process for breaking petroleum emulsions of the water-in-oil type, characterized by subjecting the emulsion to the action of a demulsifying agent without aqueous dilution, consisting of a substantially anhydrous mixture oil-soluble at least in higher concentrations and comprising the following components: (a) 15 to 50% of blown oil bodies; (b) 2 to 15% of an acid salt or salts of a sulfo fatty acid; (c) 20 to 60% of an unsaponified sulfur-free fatty acid derived by a sulfation process and followed by a hydrolytic decomposition accompanied by the splitting of sulfuric acid; (d) 5 to 25% of an aliphatic monohydric alcohol or alcohols, the said proportions being said to total 100 parts.

4. A process for breaking petroleum emulsions of the water-in-oil type, characterized by subjecting the emulsion to the action of a demulsifying agent without aqueous dilution, consisting of a substantially anhydrous mixture, oil-soluble at least in high concentrations and comprising the following components: (a) 15 to 50% of blown fatty bodies; (b) 2 to 15% of an acid salt or salts of a sulfo fatty acid; (c) 20 to 60% of an unsaponified sulfur-free fatty acid derived by a sulfation process and followed by a hydrolytic decomposition accompanied by the splitting of sulfuric acid; (d) 5 to 25% of an aliphatic monohydric alcohol or alcohols having at least three carbon atoms, the said proportions being selected to total 100 parts.

CHARLES N. STEHR.